United States Patent
Lee

(10) Patent No.: US 10,866,898 B2
(45) Date of Patent: Dec. 15, 2020

(54) METHOD AND APPARATUS FOR MIGRATING DATA BETWEEN NONVOLATILE MAIN MEMORY AND FIRST OR SECOND CACHES

(71) Applicant: SK hynix Inc., Gyeonggi-do (KR)

(72) Inventor: Hui-Won Lee, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 36 days.

(21) Appl. No.: 16/227,737

(22) Filed: Dec. 20, 2018

(65) Prior Publication Data

US 2020/0034299 A1     Jan. 30, 2020

(30) Foreign Application Priority Data

Jul. 25, 2018    (KR) ........................ 10-2018-0086791

(51) Int. Cl.
| | |
|---|---|
| *G06F 12/08* | (2016.01) |
| *G06F 12/0862* | (2016.01) |
| *G06F 12/10* | (2016.01) |
| *G06F 12/0804* | (2016.01) |
| *G06F 12/0868* | (2016.01) |
| *G06F 3/06* | (2006.01) |

(52) U.S. Cl.
CPC ......... *G06F 12/0862* (2013.01); *G06F 12/10* (2013.01); *G06F 3/0679* (2013.01); *G06F 12/0804* (2013.01); *G06F 12/0868* (2013.01); *G06F 2212/1021* (2013.01); *G06F 2212/602* (2013.01); *G06F 2212/657* (2013.01)

(58) Field of Classification Search
CPC ................. G06F 12/08; G06F 12/0246; G06F 12/00866; G06F 12/0804; G06F 12/0868; G06F 12/10; G06F 3/0679
USPC .................................................. 711/118, 103
See application file for complete search history.

(56) References Cited

U.S. PATENT DOCUMENTS

| | | | | |
|---|---|---|---|---|
| 2013/0132638 A1* | 5/2013 | Horn | ................. | G06F 12/0871 711/103 |
| 2014/0013052 A1* | 1/2014 | Sawin | ................. | G06F 12/0862 711/122 |
| 2014/0115235 A1* | 4/2014 | Ito | ................. | G06F 12/0868 711/103 |
| 2017/0075812 A1* | 3/2017 | Wu | ................. | G06F 12/0246 |

FOREIGN PATENT DOCUMENTS

KR     1020170007958     1/2017

* cited by examiner

*Primary Examiner* — Than Nguyen
(74) *Attorney, Agent, or Firm* — IP & T Group LLP

(57) ABSTRACT

A memory system includes a non-volatile memory including a main area and a first cache area; and a controller suitable for controlling the non-volatile memory and including a second cache area. The controller includes a read manager suitable for performing a migration operation of moving data stored in the main area into the first cache area based on a list storing a plurality of logical block addresses (LBAs) based on a read data access pattern.

15 Claims, 14 Drawing Sheets

| Index | List |
|---|---|
| 1 | A |
| 2 | D |
| 3 | E |
| 4 | C |
| 5 | B |

FIG. 8

| Index | List |
|-------|------|
| 1 | E |
| 2 | D |
| 3 | C |
| 4 | G |
| 5 | F |
| 6 | J |
| 7 | I |
| 8 | H |
| 9 | B |
| 10 | A |

Rows 1–3: First Section (cache)
Rows 4–8: Second Section (SLC)
Rows 9–10: Third Section (MLC)

METHOD AND APPARATUS FOR MIGRATING DATA BETWEEN NONVOLATILE MAIN MEMORY AND FIRST OR SECOND CACHES

CROSS-REFERENCE TO RELATED APPLICATION

This application claims priority under 35 U.S.C. § 119(a) to Korean Patent Application No. 10-2018-0086791, filed on Jul. 25, 2018, which is incorporated herein by reference in its entirety.

BACKGROUND

1. Field

Various embodiments of the present invention relate to a memory system. Particularly, the embodiments relate to a memory system based on a non-volatile memory, and a method for operating the memory system.

2. Description of the Related Art

Recently, the computer environment paradigm has shifted to ubiquitous computing, which allows computer systems to be used anytime and anywhere. As a result, the use of portable electronic devices such as mobile phones, digital cameras, and notebook/laptop computers has rapidly increased. In general, such portable electronic devices use a memory system which uses a memory device, that is, a data storage device. The data storage device is used as a main memory device or an auxiliary memory device of the portable electronic devices.

Since there is no mechanical driving part, such a data storage device using a memory device provides advantages such as excellent stability and durability, high information access speed, and low power consumption. Data storage devices having such advantages include a universal serial bus (USB) memory device, memory cards having various interfaces, and a solid state drive (SSD).

SUMMARY

Embodiments of the present invention are directed to a memory system that may reduce the migration of data between a Multi-Level Cell (MLC) area and a Single Level Cell (SLC) area of a non-volatile memory, and a memory system that is capable of rapidly processing data during a read operation by migrating the data that are likely to be read out among a plurality of data stored in the MLC area into the SLC area, and a method for operating the memory system.

In accordance with an embodiment of the present invention, a memory system includes: a non-volatile memory including a main area and a first cache area; and a controller suitable for controlling the non-volatile memory and including a second cache area, wherein the controller includes: a read manager suitable for performing a migration operation of moving data stored in the main area into the first cache area based on a list storing a plurality of logical block addresses (LBAs) based on a read data access pattern.

The list may store a plurality of LBAs arranged based on the frequency of performing a read operation (data read count), and updates the data read count at a set time.

The number of the LBAs may be based on the number of pages that are stored in the first cache area or the second cache area.

Data may be stored in a multi-level cell in the main area, and data may be stored in a single-level cell in the first cache area.

The read manager may perform the migration operation of moving the data stored in the main area into the first cache area by checking the list, when an idle time is detected or periodically.

The read manager may delete the data stored in the main area after the migration operation is performed.

The read manager further may include reading and copying the data stored in the main area and storing the data in the second cache area, or reading and copying the data stored in the first cache area and storing the data in the second cache area based on the list according to the read data access pattern.

The read manager may detect the number of data storage spaces of the second cache area, and then reads from the list one or more LBAs corresponding to the detected number of the data storage spaces of the second cache area and reads and copies data corresponding to the LBAs from the main area and stores the data in the second cache area.

The read manager may detect the number of data storage spaces of the second cache area, and then reads from the list one or more LBAs corresponding to the detected number of the data storage spaces of the second cache area and reads and copies data corresponding to the LBAs from the first cache area and stores the data in the second cache area.

In accordance with an embodiment of the present invention, a method for operating a memory system including a non-volatile memory having a main area and a first cache area, and a controller controlling the non-volatile memory and having a second cache area, may comprise reading a list that stores a plurality of logical block addresses (LBAs) based on a read data access pattern; and performing a migration operation of moving data stored in the main area into the first cache area based on the list or storing the data stored in the main area into the second cache area based on the list and storing the data stored in the first cache area into the second cache area based on the read list.

The list may store the plurality of LBAs arranged based on the frequency of performing a read operation (data read count), and updates the data read count at a set time.

The number of the LBAs may be based on the number of pages that are stored in the first cache area or the second cache area.

Data may be stored in a multi-level cell in the main area, and data is stored in a single-level cell in the first cache area.

The performing of the migration operation of moving the data stored in the main area into the first cache area based on the list may comprise: detecting an idle time or at a predetermined period, detecting the number of data storage spaces of the first cache area during the idle time or at the predetermined period, reading from the list one or more LBAs corresponding to the detected number of the data storage spaces of the first cache area, and migrating the data stored in the main area into the first cache area.

The data stored in the main area into the second cache area based on the list may comprise: detecting an idle time or at a predetermined period, detecting the number of data storage spaces of the second cache area during the idle time or at the predetermined period, reading from the list one or more LBAs corresponding to the detected number of the data storage spaces of the second cache area, reading data corresponding to the LBAs from the main area, and storing the read data in the second cache area.

The storing of the data stored in the first cache area into the second cache area based on the read list may comprise:

detecting an idle time or at a predetermined period, detecting the number of the data storage spaces of the second cache area during the idle time or at the predetermined period, reading from the list one or more LBAs corresponding to the detected number of the data storage spaces of the second cache area, reading data corresponding to the LBAs from the first cache area, and storing the read data into the second cache area.

In accordance with an embodiment of the present invention, a memory system, comprises: a non-volatile memory including a main area and a first cache area, the first cache area having a faster data access rate than that of the main area; and a controller including a second cache area having a faster data access rate than that of the main area, the controller being configured to: control the non-volatile memory, maintain a list indicative of a number of times in a specific time period each of the items of data are accessed, and move items of data stored in the main area into the first or second cache area based on the list.

In accordance with an embodiment of the present invention, a memory system comprises: a non-volatile memory having a first access area and a second access area that has a faster data access rate than that of the first area; and a controller including a cache area, the controller being configured to: maintain a list indicative of the relative frequencies at which items of data are accessed, and move items of data from the first area to the second area or from the first area to the cache area based on the list.

BRIEF DESCRIPTION OF THE DRAWINGS

FIG. 8 illustrates an exemplary list included in a read manager in accordance with an embodiment of the present invention.

DETAILED DESCRIPTION

Figure 1:
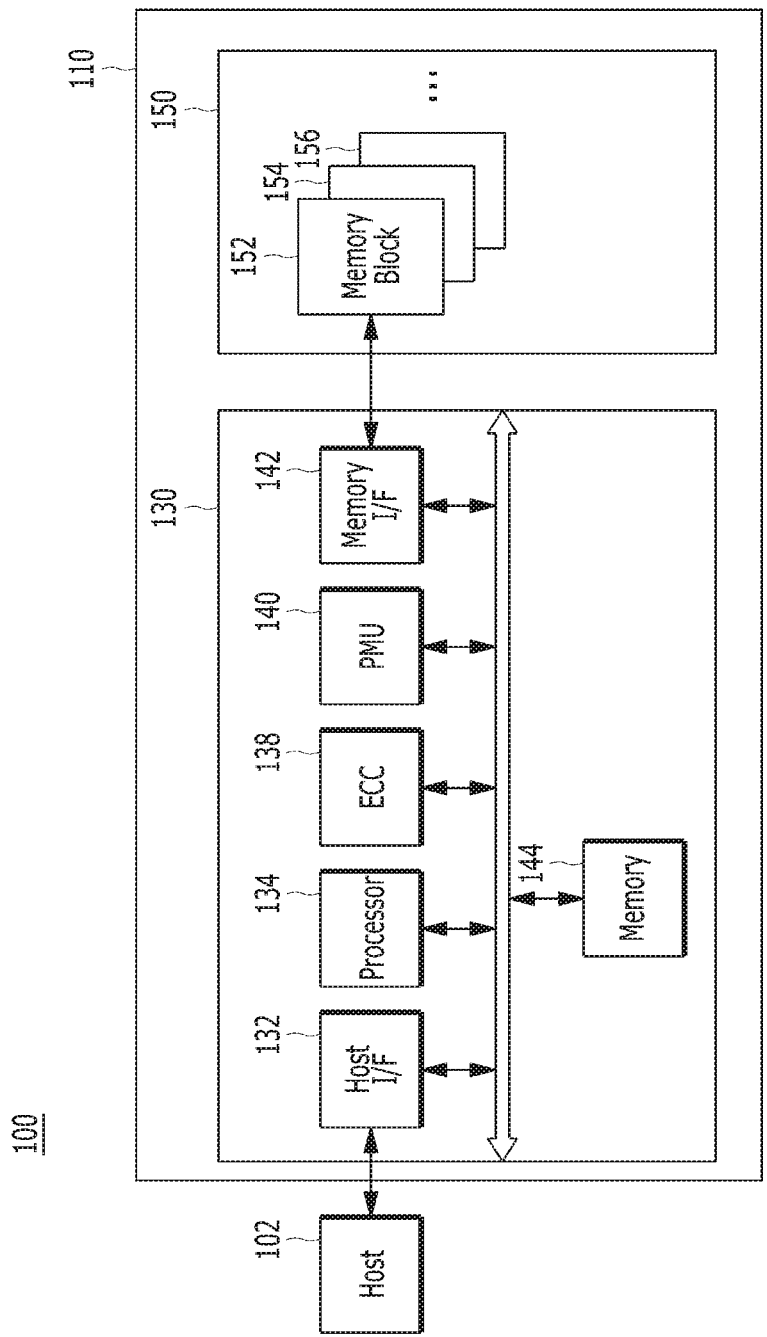
FIG. 1 is a block diagram illustrating a data processing system including a memory system in accordance with an embodiment of the present invention.

Various embodiments of the present invention will be described below in more detail with reference to the accompanying drawings. The present invention may, however, be embodied in different forms and should not be construed as limited to the embodiments set forth herein. Rather, these embodiments are provided so that this disclosure is thorough and complete and fully conveys the scope of the present invention to those skilled in the art. Throughout the disclosure, like reference numerals refer to like parts throughout the various figures and embodiments of the present invention. Also, throughout the specification, reference to "an embodiment," "another embodiment" or the like is not necessarily to only one embodiment, and different references to any such phrase are not necessarily to the same embodiment(s).

FIG. 1 is a block diagram illustrating a data processing system 100 including a memory system in accordance with an embodiment.

Referring to FIG. 1, the data processing system 100 may include a host 102 and a memory system 110.

The host 102 includes any of various electronic devices, for example, portable electronic devices such as a mobile phone, an MP3 player and a laptop computer or electronic devices such as a desktop computer, a game machine, a television (TV) and a projector, that is, wired and wireless electronic devices.

Also, the host 102 includes at least one operating system (OS). The operating system generally manages and controls the functions and operations of the host 102, and provides interoperability between the host 102 and a user using the data processing system 100 or the memory system 110. The operating system supports various functions and operations corresponding to the use(s) and application(s) of the host 102. For example, the operating system may be a general operating system or a mobile operating system depending on the mobility of the host 102. The general operating system may be a personal operating system or an enterprise operating system depending on the usage environment. For example, the personal operating system configured to support a service providing function for a general user may include Windows and Chrome, and the enterprise operating system configured to secure and support high performance may include Windows server, Linux and Unix. The mobile operating system configured to support a mobility service providing function and a system power saving function to users may include Android, iOS, Windows mobile, etc. The host 102 may include a plurality of operating systems, and executes the operating systems to perform operations with the memory system 110 in correspondence to a user request. The host 102 transmits a plurality of commands corresponding to a user request to the memory system 110, and accordingly, the memory system 110 performs operations corresponding to the commands, that is, operations corresponding to the user request.

The memory system 110 operates in response to a request of the host 102, and, in particular, stores data to be accessed by the host 102. In other words, the memory system 110 may be used as a main memory device or an auxiliary memory device of the host 102. The memory system 110 may be implemented as any one of various kinds of storage devices, depending on a host interface protocol which is coupled with the host 102. For example, the memory system 110 may be implemented as any one of a solid state driver (SSD), a multimedia card (e.g., an MMC, an embedded MMC (eMMC), a reduced size MMC (RS-MMC) and a micro-MMC), a secure digital card (e.g., an SD, a mini-SD and a micro-SD), a universal serial bus (USB) storage device, a universal flash storage (UFS) device, a compact flash (CF) card, a smart media card, and a memory stick.

The storage devices which implement the memory system 110 may be a volatile memory device such as a dynamic random access memory (DRAM) and/or a static random access memory (SRAM) or a nonvolatile memory device such as a read only memory (ROM), a mask ROM (MROM), a programmable ROM (PROM), an erasable programmable ROM (EPROM), an electrically erasable and programmable ROM (EEPROM), an ferroelectric random access memory (FRAM), a phase change RAM (PRAM), a magnetic RAM (MRAM) and/or a resistive RAM (RRAM).

The memory system 110 includes a memory device 150 which stores data to be accessed by the host 102, and a controller 130 which controls storage of data in the memory device 150.

The controller 130 and the memory device 150 may be integrated into one semiconductor device. For instance, the controller 130 and the memory device 150 may be integrated into one semiconductor device to form a solid state drive (SSD). In the case where the memory system 110 is used as an SSD, the operating speed of the host 102 which is coupled to the memory system 110 may be improved. The controller 130 and the memory device 150 may be integrated into one semiconductor device to form a memory card such as a personal computer memory card international association (PCMCIA) card, a compact flash (CF) card, a smart media card (e.g., an SM and an SMC), a memory stick, a multimedia card (e.g., an MMC, an RS-MMC and a micro-MMC), a secure digital card (e.g., an SD, a mini-SD, a micro-SD and an SDHC), and/or a universal flash storage (UFS) device.

In another embodiment, the memory system 110 may be disposed in a computer, an ultra mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation device, a black box, a digital camera, a digital multimedia broadcasting (DMB) player, a 3-dimensional television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, a radio frequency identification (RFID) device, or one of various component elements configuring a computing system.

Implemented as a nonvolatile memory device, the memory device 150 may retain stored data even though power is not supplied. In particular, the memory device 150 stores the data provided from the host 102 through a write operation, and provides stored data to the host 102 through a read operation. The memory device 150 includes a plurality of memory blocks 152, 154 and 156, each of which includes a plurality of pages. Each of the pages includes a plurality of memory cells to which a plurality of word lines (WL) are coupled. Also, the memory device 150 includes a plurality of planes, each of which includes a plurality of memory blocks, e.g., blocks 152, 154 and 156. In particular, the memory device 150 may include a plurality of memory dies, each of which includes a plurality of planes. The memory device 150 may be a nonvolatile memory device, for example, a flash memory. The flash memory may have a three-dimensional (3D) stack structure.

Detailed description of the structure of the memory device 150 including the 3D stack structure is given below with reference to FIGS. 2 to 4.

The controller 130 controls the memory device 150 in response to a request from the host 102. For example, the controller 130 provides the data read from the memory device 150 to the host 102, and stores the data provided from the host 102 in the memory device 150. To this end, the controller 130 controls the operations of the memory device 150, such as read, write, program and erase operations.

The controller 130 includes a host interface (I/F) 132, a processor 134, an error correction code (ECC) component 138, a power management unit (PMU) 140, a memory interface (I/F) 142 and a memory 144.

The host interface 132 processes the commands and data of the host 102, and may be configured to communicate with the host 102 through at least one of various interface protocols such as universal serial bus (USB), multimedia card (MMC), peripheral component interconnect express (PCI-e or PCIe), serial attached SCSI (SAS), serial advanced technology attachment (SATA), parallel advanced technology attachment (PATA), small computer system interface (SCSI), enhanced small disk interface (ESDI), integrated drive electronics (IDE) and mobile industry processor interface (MIPI). The host interface 32 may be driven through firmware referred to as a host interface layer (HIL), which is a region that exchanges data with the host 102.

The ECC component 138 corrects an error bit of the data processed in the memory device 150 and may include an ECC encoder and an ECC decoder. The ECC encoder may encode data to be programmed in the memory device 150 and generate data added with parity bits. The data added with parity bits may be stored in the memory device 150. The ECC decoder detects and corrects an error included in the data read from the memory device 150, in the case of reading the data stored in the memory device 150. That is to say, after performing error correction decoding for the data read from the memory device 150, the ECC component 138 may determine whether the error correction decoding has succeeded, output an indication signal indicative of that determination, for example, an error correction success/failure signal, and correct an error bit of the read data by using the parity bits generated in the ECC encoding process. The ECC component 138 may be unable to correct error bits when the number of error bits exceeds a correctable error bit limit, in which case the ECC component 138 may output an error correction fail signal indicating that it is incapable of correcting the error bits.

The ECC component 138 may perform error correction by using, but not limited to, a low density parity check (LDPC) code, a Bose, Chaudhuri, Hocquenghem (BCH) code, a turbo code, a Reed-Solomon (RS) code, a convolution code, a recursive systematic code (RSC), trellis-coded modulation (TCM) or Block coded modulation (BCM). The ECC component 138 may include a circuit, module, system or device for error correction.

The PMU 140 provides and manages power for the controller 130, that is, power for the component elements included in the controller 130.

The memory interface 142 serves as a memory and storage interface, which performs interfacing between the controller 130 and the memory device 150, to allow the controller 130 to control the memory device 150 in response to a request from the host 102. When the memory device 150 is a flash memory, in particular a NAND flash memory, the memory interface 142 generates control signals for the memory device 150 and processes data according to the control of the processor 134, thus functioning as a NAND flash controller (NFC). The memory interface 142 may support the operation of an interface which processes a command and data or more generally data exchanged between the controller 130 and the memory device 150, for example, a NAND flash interface. The memory interface 142 may be driven through firmware referred to as a flash interface layer (FIL), which is a region that exchanges data with the memory device 150.

The memory 144, as the working memory of the memory system 110 and the controller 130, stores data for driving of the memory system 110 and the controller 130. For example, when the controller 130 controls the memory device 150 in response to a request from the host 102, the controller 130 may provide data read from the memory device 150 to the host 102, and/or store data provided from the host 102 in the memory device 150. To this end, when the controller 130 controls the operations of the memory device 150, such as read, write, program and erase operations, the memory 144 stores data needed to allow such operations to be performed by the memory system 110, that is, between the controller 130 and the memory device 150.

The memory 144 may be realized by a volatile memory such as a static random access memory (SRAM) or a dynamic random access memory (DRAM). Furthermore, the memory 144 may disposed within the controller 130 as shown in FIG. 1. Alternatively, the memory 144 may be external to the controller 130, and in this regard, may be realized as a separate external volatile memory in communication with the controller 130 through a memory interface.

As described above, the memory 144 stores data needed to perform data read and write operations between the host 102 and the memory device 150 and data when performing the data read and write operations. For such data storage, the memory 144 includes a program memory, a data memory, a write buffer/cache, a read buffer/cache, a data buffer/cache, a map buffer/cache, and the like.

The processor 134 controls the operations of the memory system 110, and in particular, controls a program operation or a read operation for the memory device 150, in response to a write request or a read request from the host 102. The processor 134 drives firmware referred to as a flash translation layer (FTL), to control the general operations of the memory system 110. The processor 134 may be realized by a microprocessor or a central processing unit (CPU).

For instance, the controller 130 performs an operation requested from the host 102, in the memory device 150, that is, performs a command operation corresponding to a command received from the host 102, with the memory device 150, through the processor 134. The controller 130 may perform a foreground operation as a command operation corresponding to a command received from the host 102, for example, a program operation corresponding to a write command, a read operation corresponding to a read command, an erase operation corresponding to an erase command or a parameter set operation corresponding to a set parameter command or a set feature command as a set command.

The controller 130 may also perform a background operation for the memory device 150, through the processor 134. The background operation for the memory device 150 includes an operation of copying the data stored in one memory block, among the memory blocks 152, 154 and 156 of the memory device 150, to another memory block. Such a background operation may be a garbage collection (GC) operation, an operation of swapping the memory blocks 152, 154 and 156 or data stored therein, e.g., a wear leveling (WL) operation, an operation of storing map data stored in the controller 130 in the memory blocks 152, 154 and 156, e.g., a map flush operation, or an operation of performing bad block management for the memory device 150, for example, an operation of identifying and processing a bad block among the memory blocks 152, 154 and 156 in the memory device 150.

A management unit (not shown) for performing bad block management for the memory device 150 may be included in the processor 134 of the controller 130. The management unit identifies a bad block in the plurality of memory blocks 152, 154 and 156 in the memory device 150, and then, performs bad block management, which may include processing the bad block and labeling it as bad. The bad block management, in the case where the memory device 150 is a flash memory, for example, a NAND flash memory, may be performed when a program fail occurs when performing data write, for example, data program, due to the characteristic of the NAND flash memory. A memory block where the program fail has occurred is processed and labeled as a bad block, and program-failed data are written, that is, programmed, in a new memory block. Moreover, in the case where the memory device 150 has a 3D stack structure as described above, if a corresponding block is processed as a bad block according to a program fail, because the utilization efficiency of the memory device 150 and the reliability of the memory system 110 may deteriorate abruptly, it is necessary to reliably perform bad block management. A memory device in the memory system in accordance with embodiments of the present disclosure is described below in detail with reference to FIGS. 2 to 4.

Figure 2:
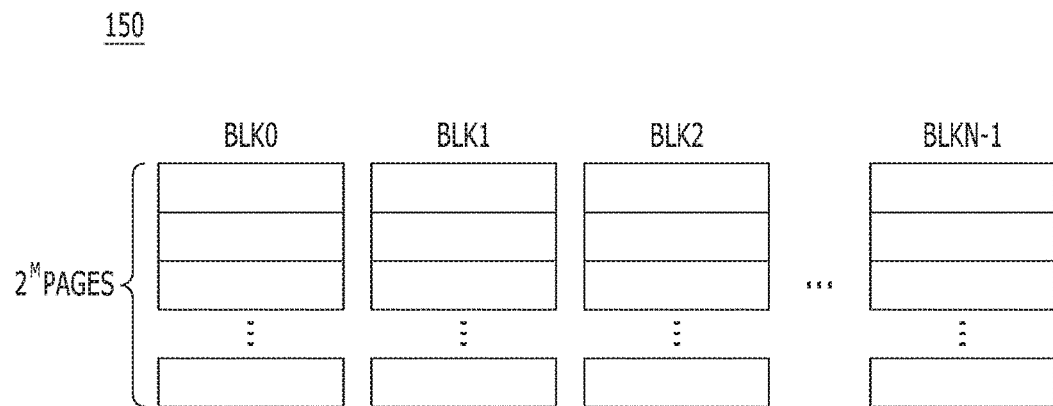
FIG. 2 is a diagram illustrating a memory device in a memory system in accordance with an embodiment of the present invention.
Figure 3:
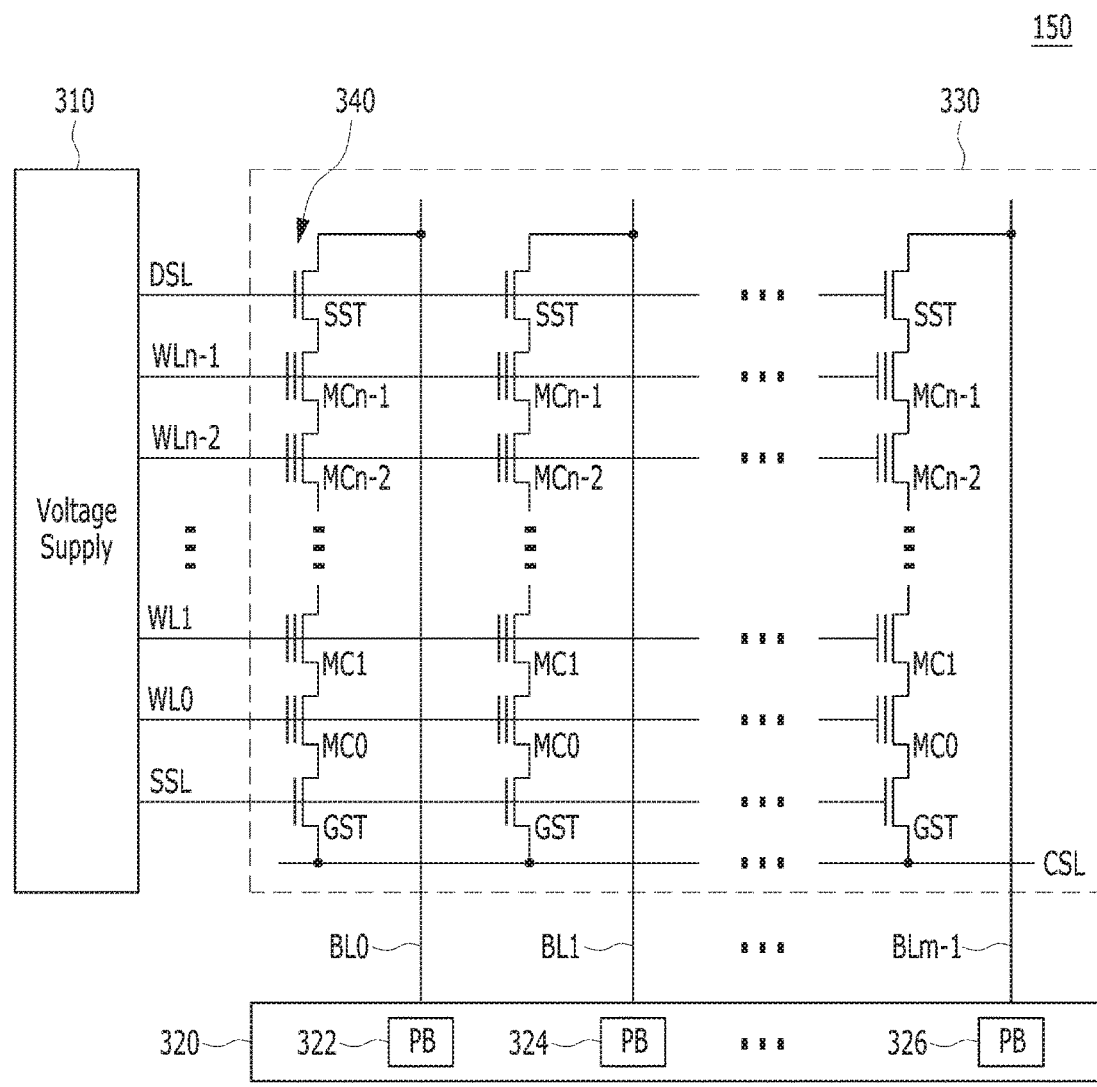
FIG. 3 is a diagram illustrating a memory cell array circuit of a memory block in a memory device in accordance with an embodiment of the present invention.
Figure 4:
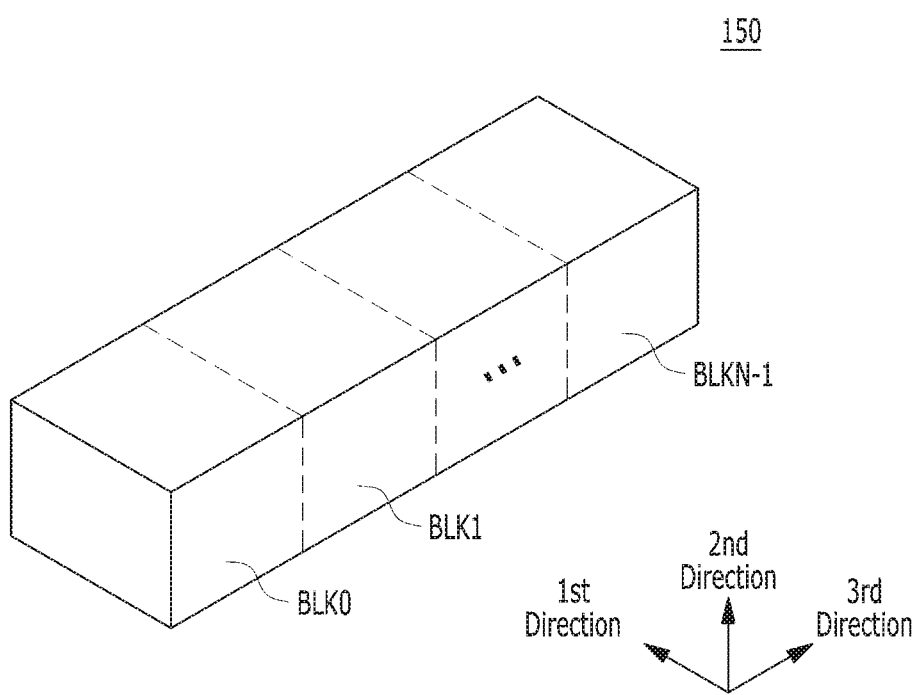
FIG. 4 is a diagram illustrating a memory device in a memory system in accordance with an embodiment of the present invention.

FIG. 2 is a diagram illustrating a memory device in a memory system, FIG. 3 is a diagram illustrating a memory cell array circuit of a memory block in a memory device, and FIG. 4 is a diagram illustrating a structure of a 3D nonvolatile memory device.

Referring to FIG. 2, the memory device 150 includes a plurality of memory blocks 152,154 and 156. Each of the blocks 152,154 and 156 includes a plurality of pages, for example, $2^M$ or M pages. Each of the pages includes a plurality of memory cells to which a plurality of word lines (WL) are coupled.

The memory device 150 may include single level cell (SLC) memory blocks and/or multi-level cell (MLC) memory blocks, depending on the number of bits to be stored in or expressed by one memory cell. An SLC memory block includes a plurality of pages which are realized by memory cells each storing 1 bit, and has high data calculation performance and high durability. An MLC memory block includes a plurality of pages which are realized by memory cells each storing multi-bit data (for example, 2 or more bits), and has a larger data storage space than the SLC memory block, that is, the MLC memory block is capable of being highly integrated. In particular, the memory device 150 may include, as MLC memory blocks, an MLC memory block including a plurality of pages which are realized by memory cells each capable of storing 2-bit data, a triple level cell (TLC) memory block including a plurality of pages which are realized by memory cells each capable of storing 3-bit data, a quadruple level cell (QLC) memory block including a plurality of pages which are realized by memory cells each capable of storing 4-bit data, or a multiple level cell memory block including pages which are realized by memory cells each capable of storing 5 or more-bit data.

While it is described as an example that the memory device 150 is realized by a nonvolatile memory such as a flash memory, for example, a NAND flash memory, it is noted that the memory device 150 may be implemented as any of multiple types of memories such as a phase change memory (i.e., phase change random access memory (PCRAM)), a resistive memory (i.e., resistive random access memory (RRAM or ReRAM)), a ferroelectric memory (i.e., ferroelectric random access memory (FRAM)) and a spin transfer torque magnetic memory (i.e., spin transfer torque magnetic random access memory (STT-RAM or STT-MRAM)).

Each of the memory blocks 152, 154 and 156 stores the data provided from the host 102 of FIG. 1 through a write operation, and provides stored data to the host 102 through a read operation.

Referring to FIG. 3, memory block 330 represents any of the memory blocks 152, 154 and 156 in the memory device 150 of the memory system 110. Each memory block 330 may include a plurality of cell strings 340 which are realized as a memory cell array and are coupled to bit lines BL0 to BLm−1, respectively. The cell string 340 of each column may include at least one drain select transistor DST and at least one source select transistor SST. A plurality of memory cells or memory cell transistors MC0 to MCn−1 may be coupled in series between the select transistors SST and DST. The respective memory cells MC0 to MCn−1 may be constructed by multi-level cells (MLC) each of which stores data or information of a plurality of bits. The cell strings 340 may be electrically coupled to corresponding bit lines BL0 to BLm−1, respectively.

While FIG. 3 shows, as an example, each memory block 330 constructed by NAND flash memory cells, it is noted that the memory device 150 is not limited to a NAND flash memory and instead may be realized by a NOR flash memory, a hybrid flash memory in which at least two kinds of memory cells are combined, or a one-NAND flash memory in which a controller is built in a memory chip. The memory device 150 may be realized as not only a flash memory device in which a charge storing layer is constructed by conductive floating gates but also a charge trap flash (CTF) memory device in which a charge storage layer is constructed by a dielectric layer.

A voltage supply circuit 310 of the memory device 150 may provide word line voltages (for example, a program voltage, a read voltage and a pass voltage) to be supplied to respective word lines according to an operation mode and voltages to be supplied to bulks (for example, well regions) formed with memory cells. The voltage generating operation of the voltage supply circuit 310 may be performed by the control of a control circuit (not shown). The voltage supply circuit 310 may generate a plurality of variable read voltages to generate a plurality of read data, select one of the memory blocks (or sectors) of a memory cell array in response to the control of the control circuit, select one of the word lines of the selected memory block, and provide the word line voltages to the selected word line and unselected word lines.

A read/write circuit 320 of the memory device 150 is controlled by a control circuit (not shown), and may operate as a sense amplifier or a write driver according to an operation mode. In a verify/normal read operation, the read/write circuit 320 may operate as a sense amplifier for reading data from the memory cell array. In a program operation, the read/write circuit 320 may operate as a write driver which drives bit lines according to data to be stored in the memory cell array. In the program operation, the read/write circuit 320 may receive data to be written in the memory cell array, from a buffer (not shown), and may drive the bit lines according to inputted data. To this end, the read/write circuit 320 may include a plurality of page buffers (PB) 322, 324 and 326 respectively corresponding to columns (or bit lines) or pairs of columns (or pairs of bit lines), and a plurality of latches (not shown) may be included in each of the page buffers 322, 324 and 326.

The memory device 150 may be realized as a two-dimensional (2D) or three-dimensional (3D) memory device. In particular, as shown in FIG. 4, the memory device 150 may be realized as a nonvolatile memory device with a 3D stack structure. In this case, the memory device 150 may include a plurality of memory blocks BLK0 to BLKN−1. FIG. 4 illustrates the memory blocks 152, 154 and 156 of the memory device 150 shown in FIG. 1. Each of the memory blocks 152, 154 and 156 may be realized as a 3D structure (or a vertical structure) which extends in first to third directions, for example, the x-axis direction, the y-axis direction and the z-axis direction, as shown in FIG. 4.

Each memory block 330 may include a plurality of NAND strings NS which extend in the second direction. The plurality of NAND strings NS may be provided in the first direction and the third direction. Each NAND string NS may be coupled to a bit line BL, at least one string select line SSL, at least one ground select line GSL, a plurality of word lines WL, at least one dummy word line DWL and a common source line CSL, and may include a plurality of transistor structures TS.

Each memory block 330 may be coupled to a plurality of bit lines BL, a plurality of string select lines SSL, a plurality of ground select lines GSL, a plurality of word lines WL, a plurality of dummy word lines DWL and a plurality of common source lines CSL, and accordingly, may include a plurality of NAND strings NS. Also, in each memory block 330, a plurality of NAND strings NS may be coupled to one bit line BL, and a plurality of transistors may be realized in one NAND string NS. A string select transistor SST of each NAND string NS may be coupled to a corresponding bit line BL, and a ground select transistor GST of each NAND string NS may be coupled to the common source line CSL. Memory cells MC may be provided between the string select transistor SST and the ground select transistor GST of each NAND string NS. Namely, a plurality of memory cells may be realized in each memory block 330.

Figures 5, 6:
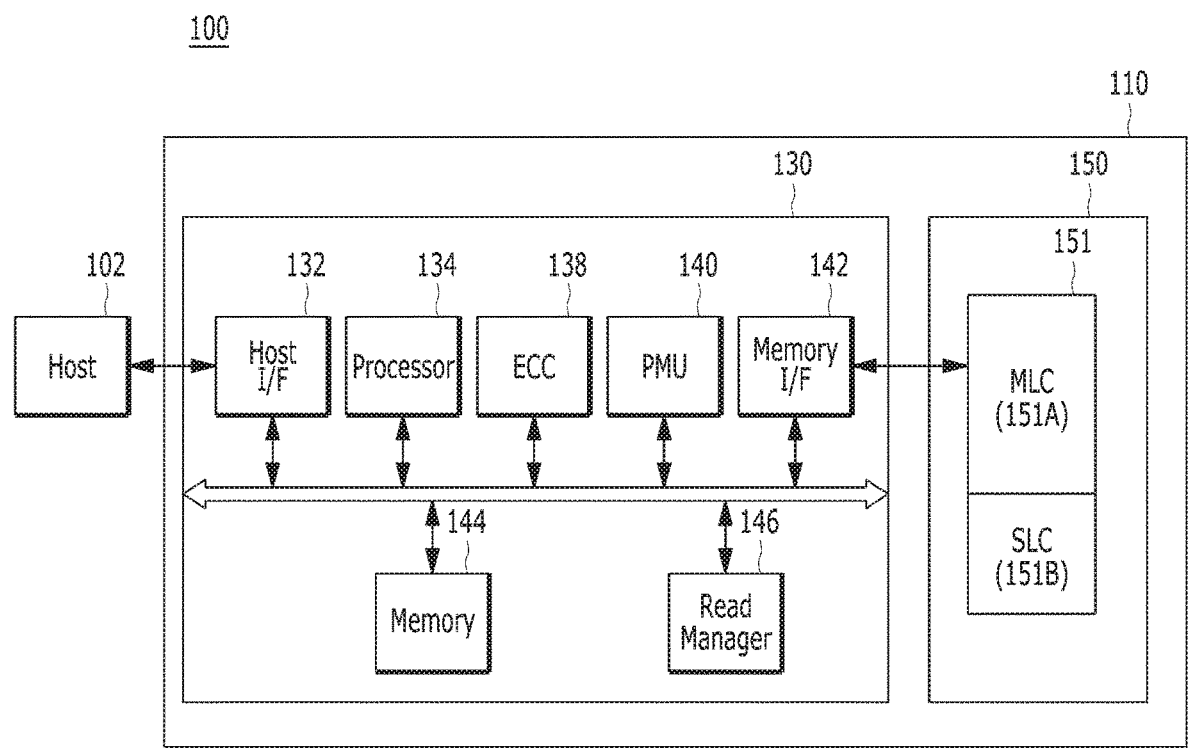
FIG. 5 is a block diagram illustrating a memory system in accordance with an embodiment of the present invention.
FIG. 6 illustrates an exemplary list included in a read manager in accordance with an embodiment of the present invention.

FIG. 5 is a block diagram illustrating a data processing system 100 including a memory system 110 in accordance with an embodiment of the present invention.

Referring to FIG. 5, the memory system 110 may include a memory device 150 and a controller 130.

The memory device 150 may include a non-volatile memory 151 and may be controlled by the controller 130 and may perform operations (e.g., a read operation and a write operation) corresponding to the requests of the controller 130. The non-volatile memory 151 may include a main area and a cache area. The main area may include a Multi-Level Cell (MLC) area 151A, and the cache area may include a Single Level Cell (SLC) area 151B. The MLC area 151A and the SLC area 151B may be realized in one memory device as illustrated in the embodiment of FIG. 5, or respectively realized in separate memory devices. A mapping scheme appropriate for a low-rate operation may be applied to the MLC area 151A, and a mapping scheme appropriate for the high-rate operation may be applied to the SLC area 151B. For example, the MLC area 151A may be managed based on a block mapping scheme, and the SLC area 151B may be managed based on a page mapping scheme. The SLC area 151B may operate at a high speed since the page mapping scheme does not require a merge operation that causes deterioration in operation performance. On the other hand, since the block mapping scheme requires such a merge operation, the MLC area 151A may operate at a relatively low speed.

The MLC area 151A may store 2-bit data in each cell, and the SLC area 151B may store 1-bit data in each cell.

The controller 150 may control a read operation or a write operation for the memory device in response to a request from the host. The controller 150 may include a host interface 132, a processor 134, an ECC 138, a PMU 140, a memory interface 142, a memory 144, and a read manager 146. Since the host interface 132, the processor 134, the ECC 138, the PMU 140, the memory interface 142, and the memory 144 are described above with reference to FIG. 1, description on them here is omitted. The read manager 146 may manage the operation of migrating the data stored in the MLC area 151A of the memory device 150 into a buffer in the SLC area 151B or the memory 144. Also, the read manager 146 may manage the operation of migrating the data stored in the SLC area 151B to the buffer in the memory 144. Operations of the read manager 146 will be described in detail with reference to FIGS. 6 to 11.

FIG. 6 illustrates an exemplary list included in the read manager 146 in accordance with an embodiment of the present invention.

Referring to FIG. 6, the list may be where logical block address (LBAs) are stored according to an access pattern of data. In general, when analyzing the access pattern of data, the data that are frequently read and/or the data that are recently read are highly likely to be read again. In this embodiment of the present invention, as illustrated in FIG. 6, the LBAs are arranged according to a data read count.

The list may store LBAs of the data that are most read recently. That is, the list may include a plurality of logical block addresses (LBAs) that are sequentially arranged according to the frequency of performing a data read operation on the associated data, sometimes referred to as a data read count. The list may be updated by checking the data read count at a set or predetermined period, which may be recurring. In this arrangement, the LBAs corresponding to the most read data may be positioned in a first area of the list. The number of the LBAs stored in the list may be based on the number of pages that may be stored in the SLC area. For example, in an embodiment of the present invention may be described based on the assumption that the number of the LBAs which may be stored in the list is equal to the number of pages that may be stored in the SLC area. For example, the list may store LBAs, corresponding to first to fifth indices, for A to E data respectively. Based on the data read count, the list may store the LBAs sequentially corresponding to the A to E data in the order of A→D→E→C→B data.

Figure 7:
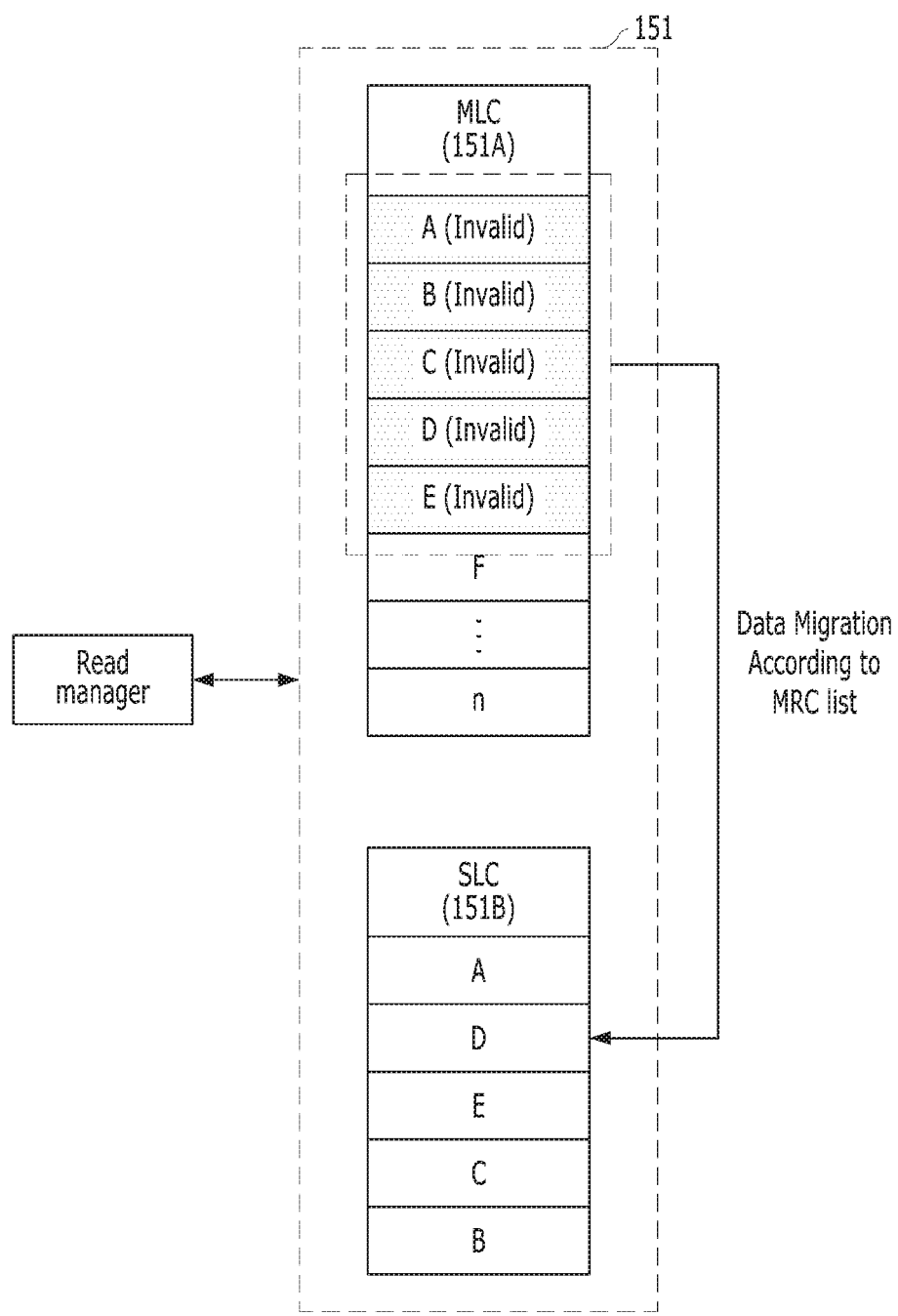
FIG. 7 illustrates operation of the read manager in accordance with an embodiment of the present invention.

FIG. 7 illustrates operation of the read manager in accordance with an embodiment of the present invention.

Referring to FIG. 7, the read manager 146 may perform a migration operation of moving data stored in the MLC area 151A into the SLC area 151B based on the list. The operation of migrating the data from the MLC area 151A into the SLC area 151B may be performed through various methods. For example, whenever an idle time is detected, the read manager 146 may perform the operation of migrating the data stored in the MLC area 151A into the SLC area 151B by checking the list. Alternatively, the operation of migrating the data stored in the MLC area 151A into the SLC area 151B may be performed periodically, e.g., at recurring set times. For example, the read manager 146 may check the list and migrate the data stored in the MLC area 151A into the SLC area 151B at every idle time. More specifically, the read manager 146 may check the LBAs corresponding to the A to E data stored in the list, and migrate the A to E data, among all data stored in the MLC area 151A, into the SLC area 151B. Since the MLC area 151A and the SLC area 151B are in non-volatile memory devices, the data in the MLC area 151A are not copied into the SLC area 151B and stored in duplicate; rather, the data stored in the MLC area 151A are migrated into the SLC area 151B. Therefore, the A data to E data stored in the MLC area 151A are invalid data.

FIG. 8 illustrates an exemplary list included in a read manager 146 in accordance with an embodiment of the present invention.

Referring to FIG. 8, the list may store LBAs according to an access pattern of data. In general, when analyzing the access pattern of data, the data having a high data read count or the data that are read recently are highly likely to be read again. This embodiment of the present invention will be described based on a list including LBAs arranged according to the data read count.

The list may be where LBAs of the data that are most read recently are stored. That is, the list may include a plurality of logical block addresses (LBAs) that are sequentially arranged according to the data read count. The list may be updated by checking the data read count at a set or predetermined period(s). The LBAs corresponding to the most frequently or most often read data may be positioned in a first area of the list. The number of the LBAs stored in the list may be based on the size obtained by merging the size of the SLC area and the size of a cache area in the memory 144. For example, the present invention may be described based on the assumption that the number of the LBAs which may be stored in the list is equal to the size obtained by merging the size of the SLC area and the size of a cache area included in the memory 144. For example, the list may store LBAs for A to J data. Based on the data read count, the list may store the LBAs sequentially corresponding to the A to J data in the order of E→D→C→G→F→J→I→H→B→A data.

Figure 9:
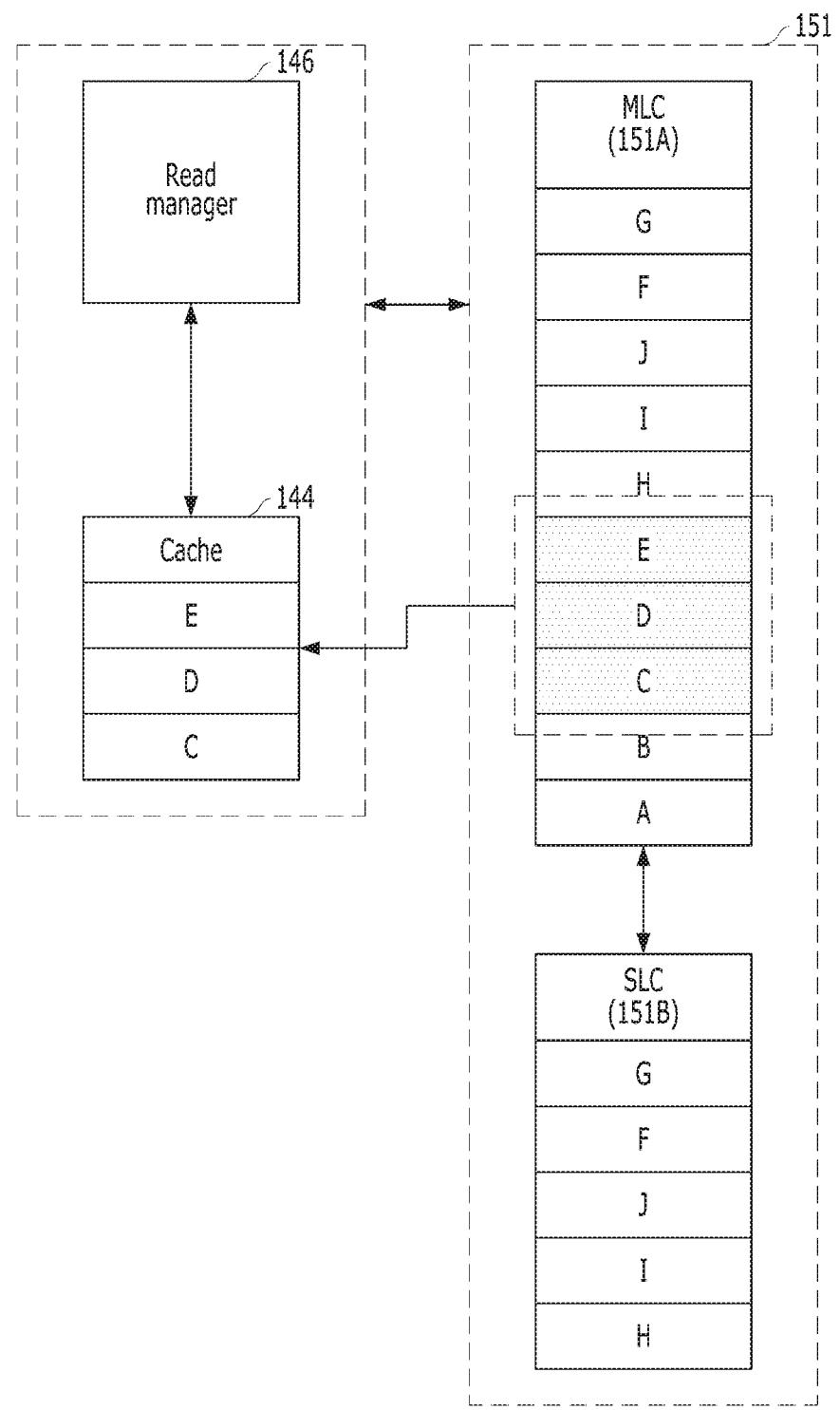
FIGS. 9 to 11 illustrate operation of the read manager in accordance with an embodiment of the present invention.
Figure 10:
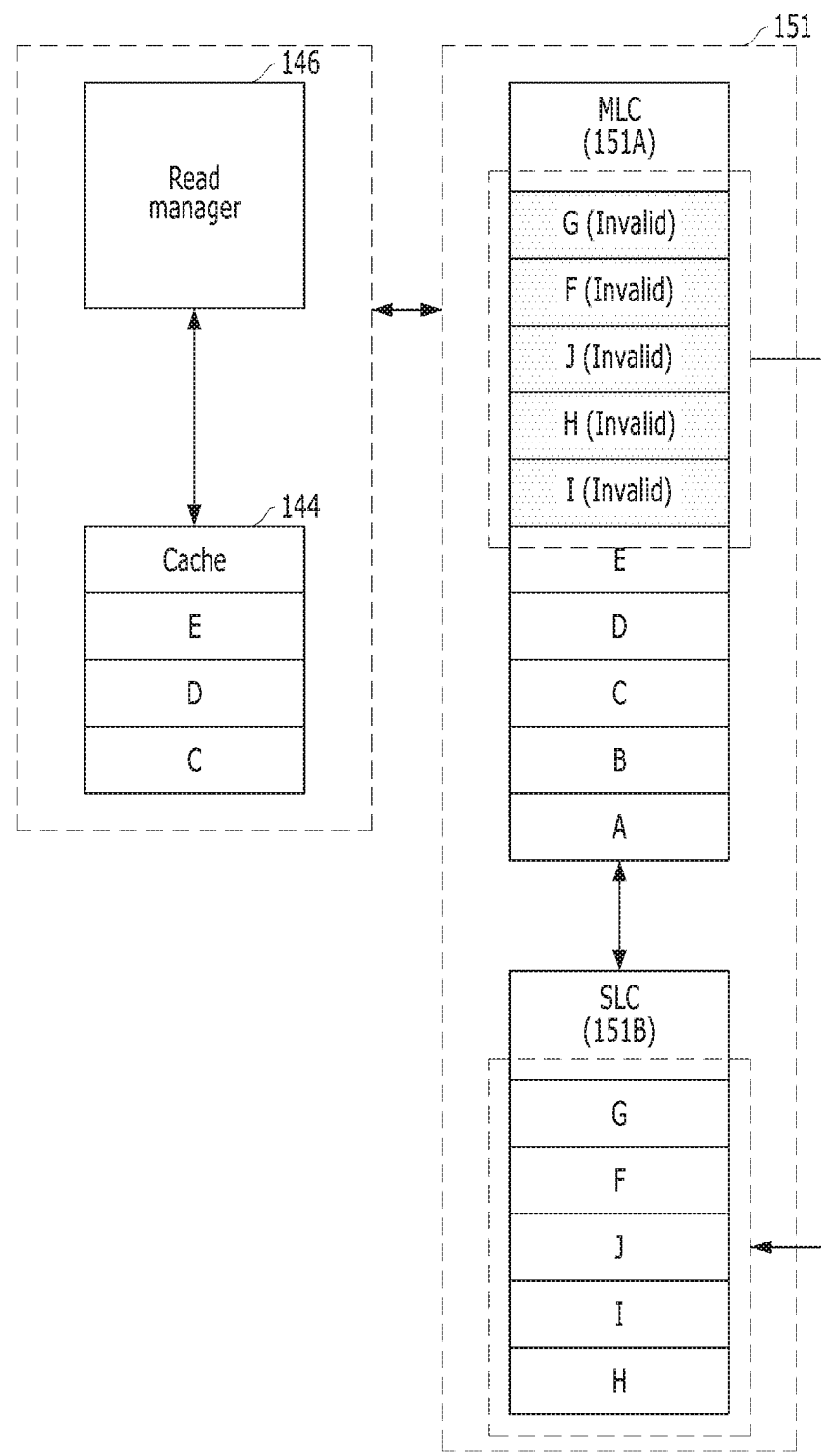
Figure 11:
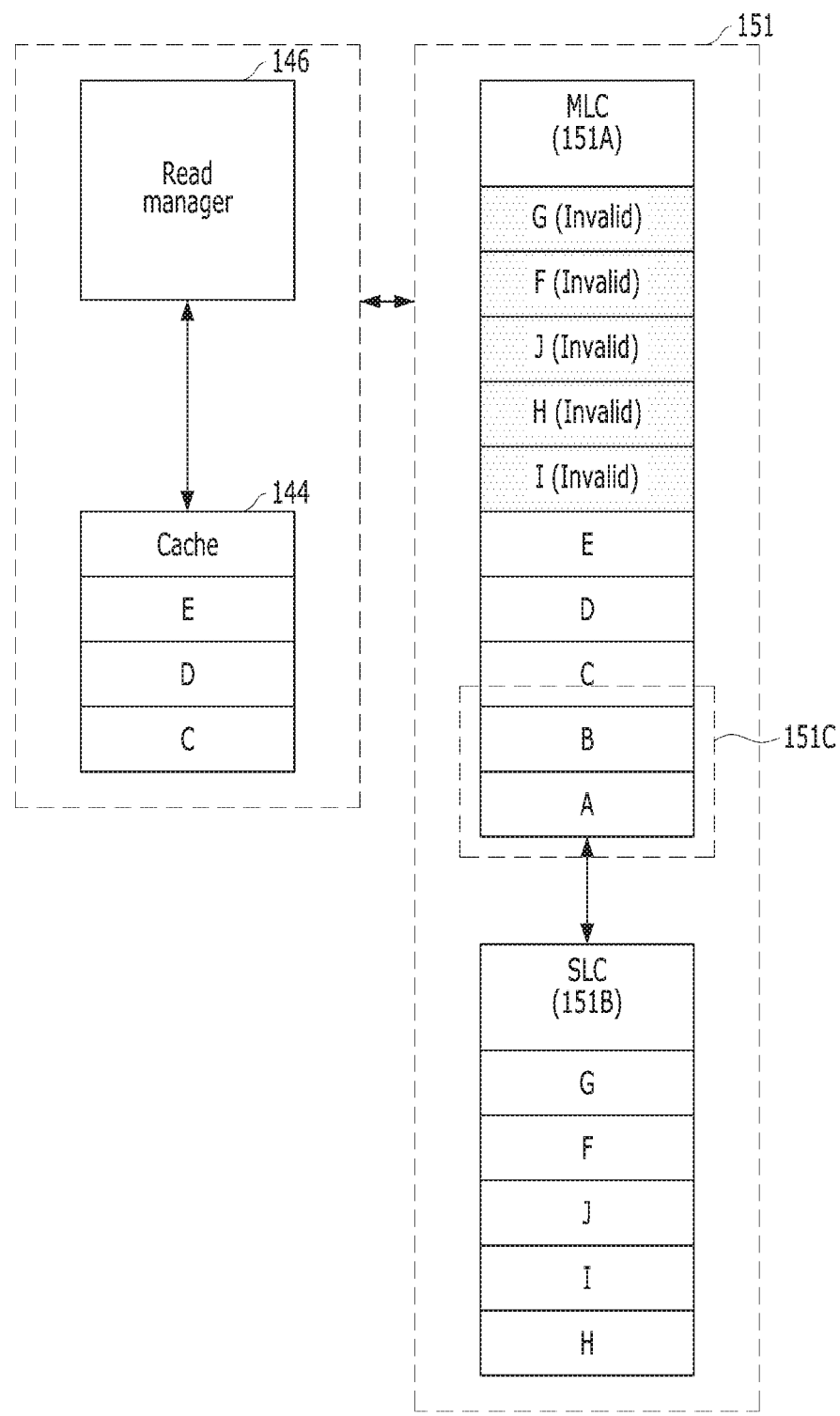

FIGS. 9 to 11 illustrate operation of the read manager 146 in accordance with an embodiment of the present invention. The read manager 146 of FIGS. 9 to 11 may copy the data stored in the MLC area 151A into the cache area 144 based on the list, or when the data are not copied into the cache area 144, the read manager 146 may migrate the data stored in the MLC area 151A into the SLC area 151B, or when the data are not migrated into the cache area 144 or the SLC area 151B, the read manager 146 may assign and operate a portion of the MLC area 151A as the SLC area 151B.

Referring to FIG. 9, the read manager 146 may copy the data stored in the MLC area 151A into the cache area 144 based on the list.

First, the read manager 146 may detect the number of data storage spaces in the cache area 144, and sequentially perform a number of read operations up to the detected number of the data storage spaces of the cache area 144 based on the LBAs stored in a first index of the list. The read manager 146 may read the data corresponding to the LBAs from the MLC area 151A, and store the data in the cache area 144. For example, when there are three data storage spaces in the cache area 144, the read manager 146 may sequentially read E-LBA, D-LBA, and C-LBA from the first index of the list. In other words, as illustrated in FIG. 9, the read manager 146 may read the data corresponding to the E-LBA, the D-LBA, and the C-LBA from the MLC area 151A based on the E-LBA, the D-LBA, and the C-LBA that are stored and read in a first section of the list, and store them in the cache area 144. When there is no data corresponding to the read LBAs in the MLC area 151A, the read manager 146 may read the data corresponding to the LBAs from the SLC area 151B and store the data in the cache area 144.

Referring to FIG. 10, the read manager 146 may perform a migration operation for moving the data stored in the MLC area 151A into the SLC area 151B based on the list.

First, the read manager 146 may detect the number of data storage spaces that may store data in the SLC area 151B, and sequentially perform a read operation as many as the detected data storage spaces of the SLC area 151B. The read manager 146 may read the data corresponding to the LBAs from the MLC area 151A based on the read LBAs and migrate the data into the SLC area 151B. For example, when it is assumed that there are five data storage spaces in the SLC area 151B, the read manager 146 may read G-LBA, F-LBA, J-LBA, I-LBA, and H-LBA among the LBAs except the first section from the list. The read manager 146 may read the data corresponding to the G-LBA, F-LBA, J-LBA, I-LBA, and H-LBA from the MLC area 151A into the SLC area 151B based on the G-LBA, the F-LBA, the J-LBA, the I-LBA, and the H-LBA that are read. Therefore, the data corresponding to the G-LBA, the F-LBA, the J-LBA, the I-LBA, and the H-LBA that are stored in the MLC area 151A may be invalid data.

Referring to FIG. 11, when the read manager 146 does not perform an operation of migrating the data stored in the MLC area 151A into the SLC area 151B or copying the data stored in the MLC area 151A into the cache area based on the list, the read manager 146 may assign a portion of the MLC area 151A and migrate the data into the portion of the MLC area 151A.

First, the read manager 146 may detect the space that may store data in the cache area 144 and the SLC area 151B. When the storage space in the cache area 144 and the SLC area 151B is insufficient, the data corresponding to the remaining LBAs of the MLC area 151A, except the first and second sections of the list, that is, the data corresponding to the LBAs in a third section, may not be copied into the cache area 144 or migrated into the SLC area 151B. Here, a portion 151C may be assigned in the MLC area 151A, and the data corresponding to the LBAs included in the third section may be migrated into the assigned portion 151C. For example, when the storage space is insufficient in the cache area 144 and the SLC area 151B, the read manager 146 may read B-LBA and A-LBA that are in the third section from the list. The read manager 146 may assign the portion 151C in the MLC area 151A based on the B-LBA and the A-LBA that are read and migrate the data corresponding to the B-LBA and the A-LBA into the portion 151C of the MLC area 151A.

With reference to FIGS. 12 to 20, a data processing system and electronic appliances, to which the memory system 110 including the memory device 150 and the controller 130 described above, may be applied, in accordance with embodiments, are described.

Figure 12:
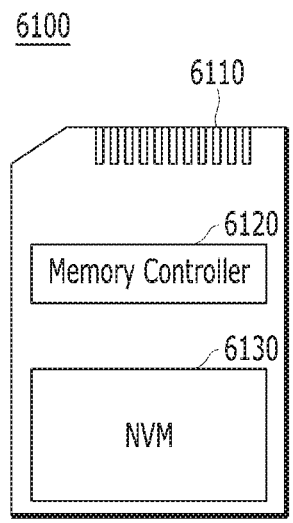
FIGS. 12 to 20 are diagrams illustrating exemplary applications of memory systems in accordance with embodiments of the present invention.

FIG. 12 is a diagram illustrating a data processing system including a memory system in accordance with an embodiment. FIG. 12 illustrates a memory card system 6100 to which the memory system is applied.

Referring to FIG. 12, the memory card system 6100 includes a connector 6110, a memory controller 6120 and a memory device 6130.

The memory controller 6120 is connected with, for access to, the memory device 6130, which is implemented as a nonvolatile memory (NVM). For example, the memory controller 6120 controls the read, write, erase and background operations of the memory device 6130. The memory controller 6120 provides an interface between the memory device 6130 and a host (not shown), and drives firmware for controlling the memory device 6130. That is to say, the memory controller 6120 may correspond to the controller 130 in the memory system 110 described above with reference to FIG. 1, and the memory device 6130 may correspond to the memory device 150 in the memory system 110 described above with reference to FIG. 1.

Therefore, the memory controller 6120 may include components such as a random access memory (RAM), a processor, a host interface, a memory interface and an error correction component.

The memory controller 6120 may communicate with an external device, for example, the host 102 described above with reference to FIG. 1, through the connector 6110. For example, as described above with reference to FIG. 1, the memory controller 6120 may be configured to communicate with the external device through at least one of various communication protocols such as universal serial bus (USB), multimedia card (MMC), embedded MMC (eMMC), peripheral component interconnection (PCI), PCI express (PCIe), advanced technology attachment (ATA), serial ATA, parallel ATA, small computer system interface (SCSI), enhanced small disk interface (ESDI), integrated drive electronics (IDE), Firewire, universal flash storage (UFS), WiFi or Wi-Fi and Bluetooth. Accordingly, the memory system and the data processing system in accordance with an embodiment may be applied to wired and/or wireless electronic appliances, particularly a mobile electronic appliance.

The memory device 6130 may be implemented by a nonvolatile memory such as an electrically erasable and programmable ROM (EPROM), a NAND flash memory, a NOR flash memory, a phase-change RAM (PRAM), a resistive RAM (ReRAM), a ferroelectric RAM (FRAM) and/or a spin torque transfer magnetic RAM (STT-MRAM).

The controller 6120 and the memory device 6130 may be integrated into one semiconductor device to form a solid state drive (SSD), or a memory card such as a PC card (e.g., personal computer memory card international association (PCMCIA)), a compact flash card (CF), a smart media card (e.g., SM and SMC), a memory stick, a multimedia card (e.g., MMC, RS-MMC, MMCmicro and eMMC), a secure digital (SD) card (e.g., SD, miniSD, microSD and SDHC) or a universal flash storage (UFS).

Figure 13:
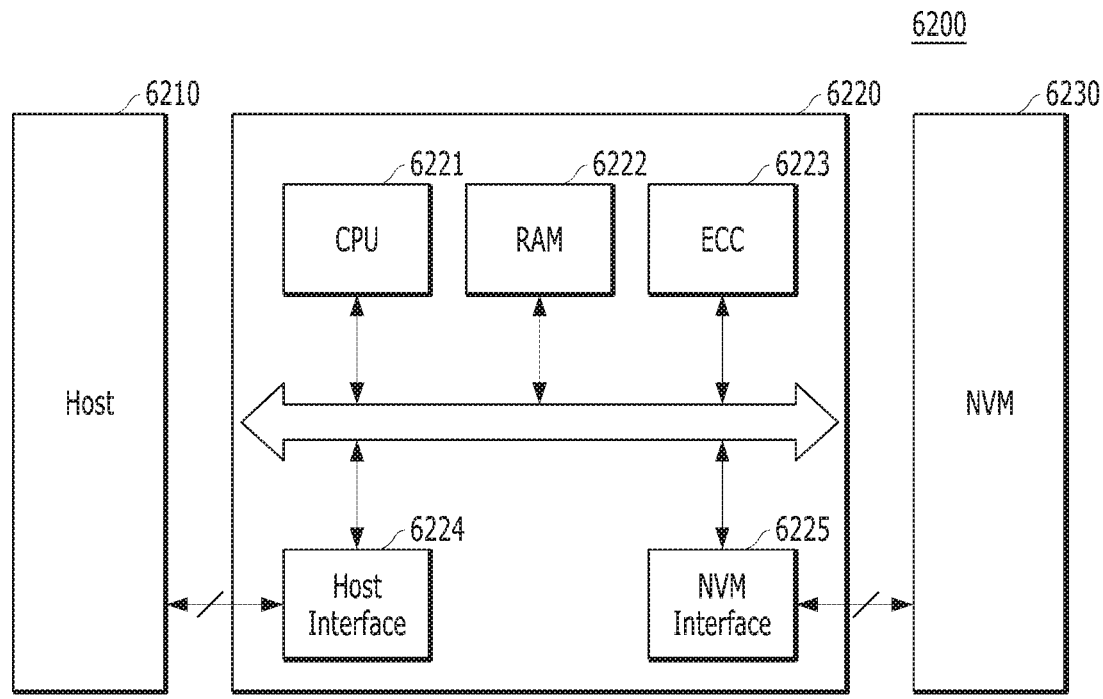

FIG. 13 is a diagram illustrating a data processing system 6200 including a memory system in accordance with an embodiment.

Referring to FIG. 13, the data processing system 6200 includes a memory device 6230 which is implemented by at least one nonvolatile memory (NVM) and a memory controller 6220 which controls the memory device 6230. The data processing system 6200 may be a storage medium such as a memory card (e.g., CF, SD and microSD). The memory device 6230 may correspond to the memory device 150 in the memory system 110 described above with reference to FIG. 1, and the memory controller 6220 may correspond to the controller 130 in the memory system 110 described above with reference to FIG. 1.

The memory controller 6220 controls read, write and erase operations for the memory device 6230 in response to requests from a host 6210. The memory controller 6220 includes at least one CPU 6221, a buffer memory, for example, a RAM 6222, an ECC circuit 6223, a host interface 6224, and a memory interface, for example, an NVM interface 6225.

The CPU 6221 may control general operations for the memory device 6230, for example, read, write, file system management, bad page management, and the like. The RAM 6222 operates according to control of the CPU 6221, and may be used as a work memory, a buffer memory, a cache memory, or the like. In the case where the RAM 6222 is used as a work memory, data processed by the CPU 6221 is temporarily stored in the RAM 6222. In the case where the RAM 6222 is used as a buffer memory, the RAM 6222 is used to buffer data to be transmitted from the host 6210 to the memory device 6230 or from the memory device 6230 to the host 6210. In the case where the RAM 6222 is used as a cache memory, the RAM 6222 may be used to enable the memory device 6230 of a low speed to operate at a high speed.

The ECC circuit 6223 corresponds to the ECC component 138 of the controller 130 described above with reference to FIG. 1. As described above with reference to FIG. 1, the ECC circuit 6223 generates an error correction code (ECC) for correcting a failed bit or an error bit in the data received from the memory device 6230. Also, the ECC circuit 6223 performs error correction encoding for data to be provided to the memory device 6230, and generates data with added parity bits. The parity bits may be stored in the memory device 6230. The ECC circuit 6223 may perform error correction decoding for data outputted from the memory device 6230. The ECC circuit 6223 may correct errors by using the parity bits. For example, as described above with reference to FIG. 1, the ECC circuit 6223 may correct errors by using various coded modulations such as an LDPC code, a BCH code, a turbo code, a Reed-Solomon code, a convolution code, an RSC, a TCM and a BCM.

The memory controller 6220 transmits and receives data to and from the host 6210 through the host interface 6224, and transmits and receives data to and from the memory device 6230 through the NVM interface 6225. The host interface 6224 may be connected with the host 6210 through a PATA bus, a SATA bus, an SCSI, a USB, a PCIe or a NAND interface. Further, as a wireless communication function or a mobile communication protocol such as WiFi or long term evolution (LTE) is implemented, the memory controller 6220 may transmit and receive data by being connected with an external device, for example, the host 6210 or another external device. Specifically, as the memory controller 6220 is configured to communicate with an external device through at least one among various communication protocols, the memory system and the data processing system in accordance with an embodiment may be applied to wired and/or wireless electronic appliances, particularly a mobile electronic appliance.

Figure 14:
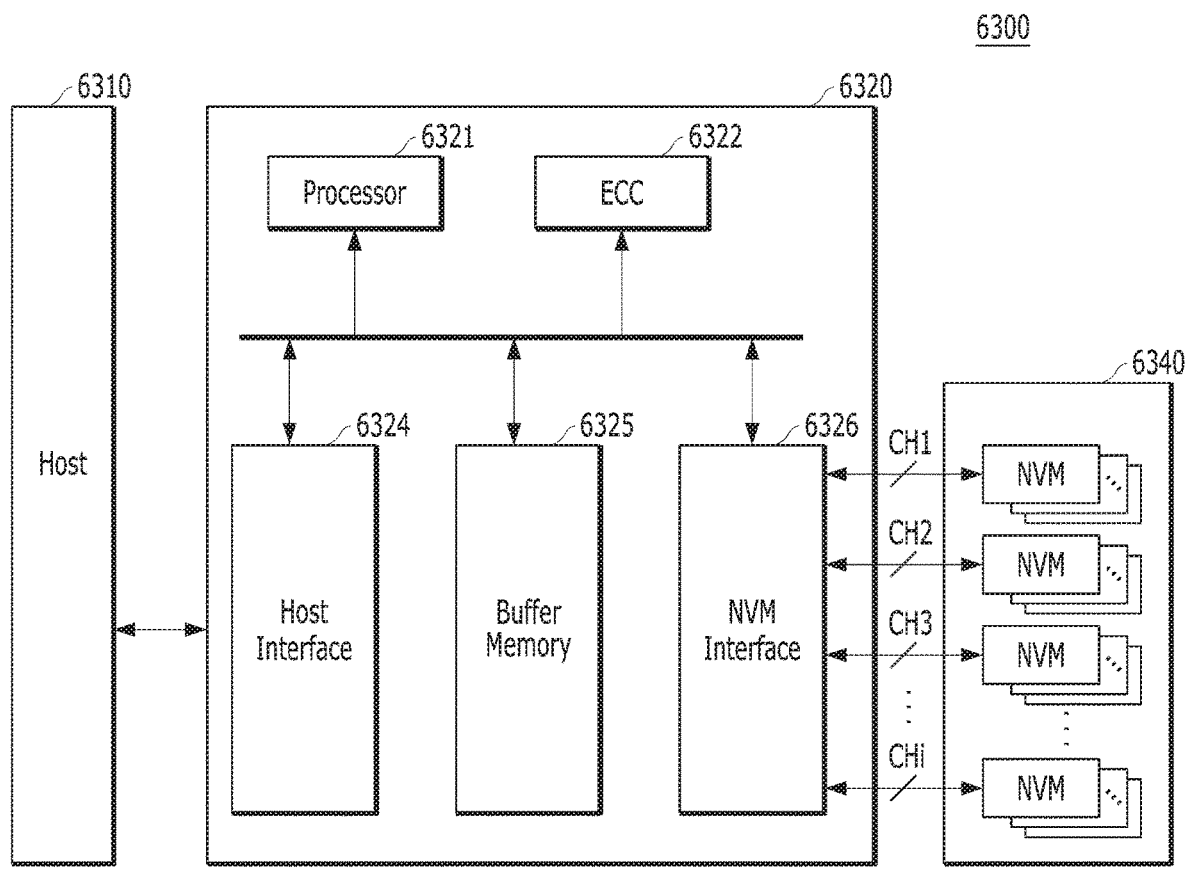

FIG. 14 is a diagram illustrating a data processing system including a memory system in accordance with an embodiment. FIG. 14 illustrates a solid state drive (SSD) 6300 to which the memory system is applied.

Referring to FIG. 14, the SSD 6300 includes a controller 6320 and a memory device 6340 which includes a plurality of nonvolatile memories (NVM). The controller 6320 may correspond to the controller 130 in the memory system 110 described above with reference to FIG. 1, and the memory device 6340 may correspond to the memory device 150 in the memory system 110 described above with reference to FIG. 1.

The controller 6320 is connected with the memory device 6340 through a plurality of channels CH1, CH2, CH3, . . . and CHi. The controller 6320 includes at least one processor 6321, an ECC circuit 6322, a host interface 6324, a buffer memory 6325, and a memory interface, for example, a nonvolatile memory interface 6326.

The buffer memory 6325 temporarily stores data received from a host 6310 or data received from a plurality of flash memories NVMs included in the memory device 6340, or temporarily stores metadata of the plurality of flash memories NVMs, for example, map data including mapping tables. The buffer memory 6325 may be realized by a volatile memory such as, but not limited to, a DRAM, an SDRAM, a DDR SDRAM, an LPDDR SDRAM and a GRAM, or a nonvolatile memory such as, but not limited to, an FRAM, an ReRAM, an STT-MRAM and a PRAM. While it is illustrated in FIG. 13 that the buffer memory 6325 is disposed inside the controller 6320, the buffer memory 6325 may be disposed external to the controller 6320.

The ECC circuit 6322 calculates error correction code values of data to be programmed in the memory device 6340 in a program operation. The ECC circuit 6322 performs an error correction operation for data read from the memory device 6340, based on the error correction code values, in a read operation. The ECC circuit 6322 performs an error correction operation for data recovered from the memory device 6340 in a recovery operation for failed data.

The host interface 6324 provides an interface function with respect to an external device, for example, the host 6310, and the nonvolatile memory interface 6326 provides an interface function with respect to the memory device 6340 which is connected through the plurality of channels CH1, CH2, CH3, . . . and CHi.

As a plurality of SSDs 6300 to each of which the memory system 110 described above with reference to FIG. 1 is applied are used, a data processing system, for example, a redundant array of independent disks (RAID) system may be implemented. In the RAID system, the plurality of SSDs 6300 and an RAID controller for controlling the plurality of SSDs 6300 may be included. In the case of performing a program operation by receiving a write command from the host 6310, the RAID controller may select at least one memory system, that is, at least one SSD 6300, in correspondence to the RAID level information of the received write command received, among a plurality of RAID levels, that is, the plurality of SSDs 6300, and may output data corresponding to the write command to the selected SSD 6300. Also, in the case of performing a read operation by receiving a read command from the host 6310, the RAID controller may select at least one memory system, that is, at least one SSD 6300, in correspondence to the RAID level information of the received read command, among the plurality of RAID levels, that is, the plurality of SSDs 6300, and may provide data outputted from the selected SSD 6300 to the host 6310.

Figure 15:
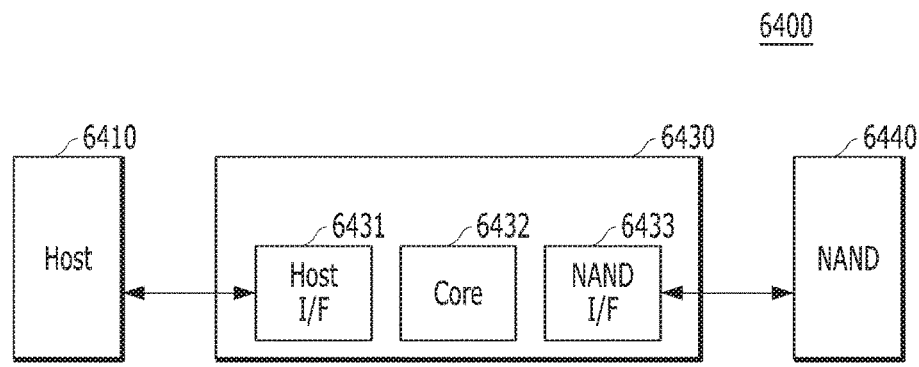

FIG. 15 is a diagram illustrating a data processing system including a memory system in accordance with an embodiment. FIG. 15 illustrates an embedded multimedia card (eMMC) 6400 to which the memory system is applied.

Referring to FIG. 15, the eMMC 6400 includes a controller 6430 and a memory device 6440 which is implemented by at least one NAND flash memory. The controller 6430 may correspond to the controller 130 in the memory system 110 described above with reference to FIG. 1, and the memory device 6440 may correspond to the memory device 150 in the memory system 110 described above with reference to FIG. 1.

The controller 6430 is connected with the memory device 6440 through a plurality of channels. The controller 6430 includes at least one core 6432, a host interface (I/F) 6431, and a memory interface, i.e., a NAND interface (I/F) 6433.

The core 6432 controls general operations of the eMMC 6400. The host interface 6431 provides an interface function between the controller 6430 and a host 6410. The NAND interface 6433 provides an interface function between the memory device 6440 and the controller 6430. For example, the host interface 6431 may be a parallel interface, for example, an MMC interface, as described above with reference to FIG. 1, and may be a serial interface, for example, a ultra high speed (UHS)-I/UHS-II and/or a UFS interface.

FIGS. 16 to 19 are diagrams illustrating examples of data processing systems including a memory system in accordance with embodiments. Each of FIGS. 16 to 19 illustrates a universal flash storage (UFS) to which the memory system is applied.

Referring to FIGS. 16 to 19, respective UFS systems 6500, 6600, 6700 and 6800 may include hosts 6510, 6610, 6710 and 6810, UFS devices 6520, 6620, 6720 and 6820 and UFS cards 6530, 6630, 6730 and 6830, respectively. The respective hosts 6510, 6610, 6710 and 6810 may be wired and/or wireless electronic appliances, in particular, application processors of mobile electronic appliances or the likes. The respective UFS devices 6520, 6620, 6720 and 6820 may be embedded UFS devices. The respective UFS cards 6530, 6630, 6730 and 6830 may be external embedded UFS devices or removable UFS cards.

In the respective UFS systems 6500, 6600, 6700 and 6800, the hosts 6510, 6610, 6710 and 6810, the UFS devices 6520, 6620, 6720 and 6820 and the UFS cards 6530, 6630, 6730 and 6830 may communicate with external devices, for example, wired and/or wireless electronic appliances, in particular, mobile electronic appliances or the like, through UFS protocols. The UFS devices 6520, 6620, 6720 and 6820 and the UFS cards 6530, 6630, 6730 and 6830 may be implemented as the memory system 110 described above with reference to FIG. 1. For example, in the respective UFS systems 6500, 6600, 6700 and 6800, the UFS devices 6520, 6620, 6720 and 6820 may be implemented in the form of the data processing system 6200, the SSD 6300 or the eMMC 6400 described above with reference to FIGS. 13 to 15, and the UFS cards 6530, 6630, 6730 and 6830 may be implemented in the form of the memory card system 6100 described above with reference to FIG. 12.

In the respective UFS systems 6500, 6600, 6700 and 6800, the hosts 6510, 6610, 6710 and 6810, the UFS devices 6520, 6620, 6720 and 6820 and the UFS cards 6530, 6630, 6730 and 6830 may perform communication through the universal flash storage (UFS) interface, for example, MIPI M-PHY and MIPI Unified Protocol (UniPro) in Mobile Industry Processor Interface (MIPI). The UFS devices 6520, 6620, 6720 and 6820 and the UFS cards 6530, 6630, 6730 and 6830 may perform communication through another protocol other than the UFS protocol, for example, any of various card protocols such as universal storage bus (USB) Flash Drives (UFDs), multi-media card (MMC), secure digital (SD), mini SD and Micro SD.

Figure 16:
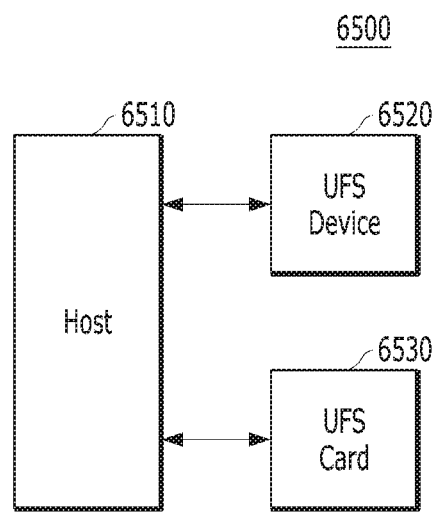
Figure 17:
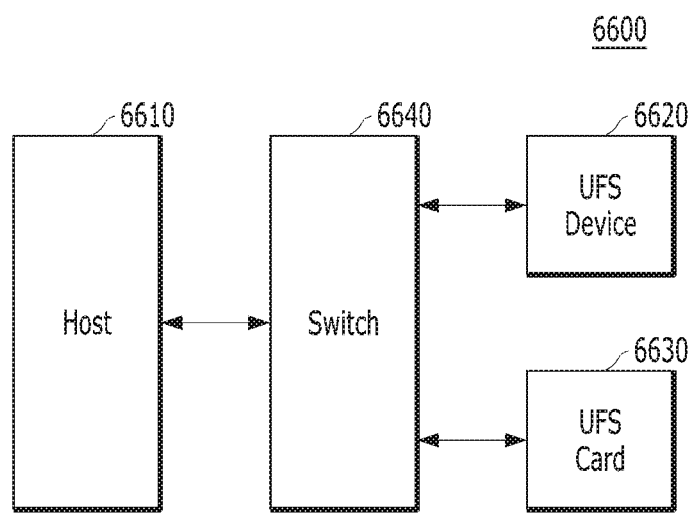

In the UFS system 6500 shown in FIG. 16, UniPro exists in each of the host 6510, the UFS device 6520 and the UFS card 6530. The host 6510 performs a switching operation to perform communication with each of the UFS device 6520 and the UFS card 6530. In particular, the host 6510 performs communication with the UFS device 6520 or the UFS card 6530, through link layer switching in UniPro, for example, L3 switching. The UFS device 6520 and the UFS card 6530 may perform communication through link layer switching in the UniPro of the host 6510. While it is described as an example that one UFS device 6520 and one UFS card 6530 are coupled to the host 6510, it is noted that a plurality of UFS devices and a plurality of UFS cards may be coupled to the host 6510 in a parallel or a star type arrangement. Also, a plurality of UFS cards may be coupled to the UFS device 6520 in any of a parallel, a star, a serial or a chain type arrangement.

In the UFS system 6600 shown in FIG. 16, UniPro exists in each of the host 6610, the UFS device 6620 and the UFS card 6630. The host 6610 performs communication with the UFS device 6620 or the UFS card 6630 through a switching module 6640 which performs a switching operation, in particular, a switching module 6640 which performs link layer switching in UniPro, for example, an L3 switching operation. The UFS device 6620 and the UFS card 6630 may perform communication through link layer switching in the UniPro of the switching module 6640. While it is described as an example that one UFS device 6620 and one UFS card 6630 are coupled to the switching module 6640, it is noted that a plurality of UFS devices and a plurality of UFS cards may be coupled to the switching module 6640 in a parallel type or a star type arrangement. Also, a plurality of UFS cards may be coupled to the UFS device 6620 in any of a parallel, a star, a serial or a chain type arrangement.

Figure 18:
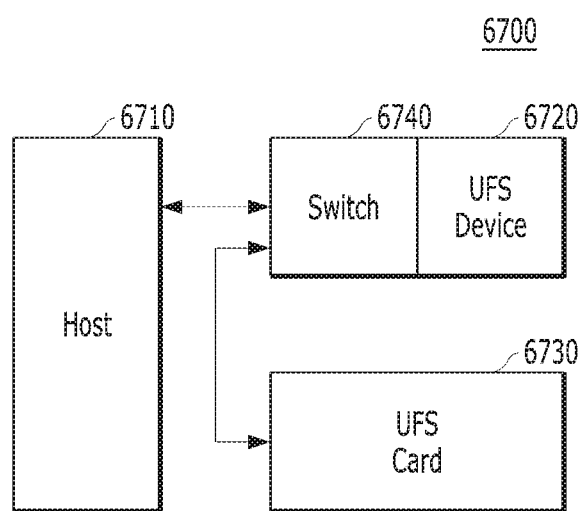

In the UFS system 6700 shown in FIG. 18, UniPro exists in each of the host 6710, the UFS device 6720 and the UFS card 6730. The host 6710 performs communication with the UFS device 6720 or the UFS card 6730 through a switching module 6740 which performs a switching operation, in particular, the switching module 6740 which performs link layer switching in UniPro, for example, an L3 switching operation. The UFS device 6720 and the UFS card 6730 may perform communication through link layer switching in the UniPro of the switching module 6740. The switching module 6740 may be implemented as one module with the UFS device 6720 inside or outside the UFS device 6720. While it is described as an example that one UFS device 6720 and one UFS card 6730 are coupled to the switching module 6740, it is noted that a plurality of modules in which the switching module 6740 and the UFS device 6720 are respectively implemented may be coupled to the host 6710 in a parallel type or a star type arrangement. Also, respective modules may be coupled in a serial type or a chain type arrangement, or a plurality of UFS cards may be coupled to the switching module 6740 in a parallel type or a star type arrangement.

Figure 19:
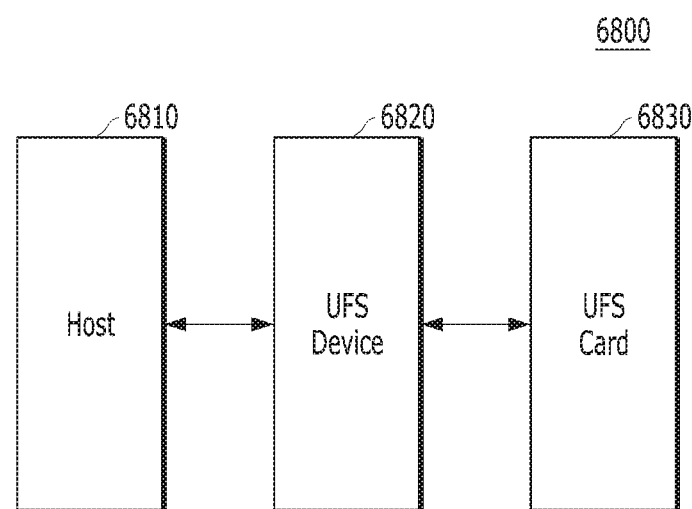

In the UFS system 6800 shown in FIG. 19, M-PHY and UniPro exist in each of the host 6810, the UFS device 6820 and the UFS card 6830. The UFS device 6820 performs a switching operation to perform communication with the host 6810 and the UFS card 6830. In particular, the UFS device 6820 performs communication with the host 6810 or the UFS card 6830, through switching between M-PHY and UniPro modules for communication with the host 6810 and M-PHY and UniPro modules for communication with the UFS card 6830, for example, target identifier (ID) switching. The host 6810 and the UFS card 6830 may perform communication through target ID switching between M-PHY and UniPro modules of the UFS device 6820. While it is described as an example that one UFS device 6820 is coupled to the host 6810 and one UFS card 6830 is coupled to one UFS device 6820, it is noted that a plurality of UFS devices may be coupled to the host 6810 in a parallel type or a star type arrangement. Also, a plurality of UFS cards may be coupled to one UFS device 6820 in any of a parallel, a star, a serial, or a chain type arrangement.

Figure 20:
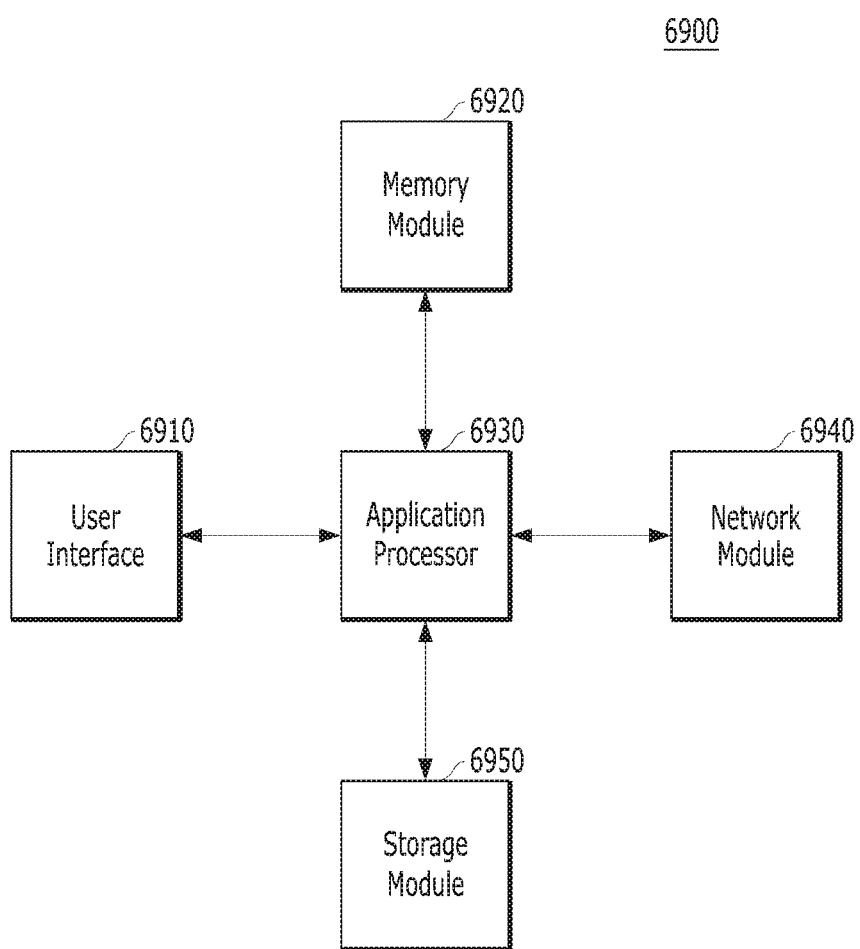

FIG. 20 is a diagram illustrating a data processing system including a memory system in accordance with an embodiment. FIG. 20 illustrates a user system 6900 to which the memory system is applied.

Referring to FIG. 20, the user system 6900 includes a user interface 6910, a memory module 6920, an application processor 6930, a network module 6940, and a storage module 6950.

The application processor 6930 drives components included in the user system 6900 and an operating system (OS). For example, the application processor 6930 may include controllers for controlling the components included in the user system 6900, interfaces, graphics engines, and other components. The application processor 6930 may be provided as a system-on-chip (SoC).

The memory module 6920 may operate as a main memory, a working memory, a buffer memory or a cache memory of the user system 6900. The memory module 6920 may include a volatile random access memory such as a DRAM, an SDRAM, a DDR SDRAM, a DDR2 SDRAM, a DDR3 SDRAM, an LPDDR SDRAM, an LPDDR2 SDRAM and/or an LPDDR3 SDRAM, or a nonvolatile random access memory such as a PRAM, an ReRAM, an MRAM and/or an FRAM. For example, the application processor 6930 and the memory module 6920 may be mounted as a package-on-package (PoP).

The network module 6940 may communicate with external devices. For example, the network module 6940 may support not only wired communications but also various wireless communications such as code division multiple access (CDMA), global system for mobile communication (GSM), wideband CDMA (WCDMA), CDMA-2000, time division multiple access (TDMA), long term evolution (LTE), worldwide interoperability for microwave access (Wimax), wireless local area network (WLAN), ultra-wideband (UWB), Bluetooth, wireless display (WI-DI), and the like, and may thereby communicate with wired and/or wireless electronic appliances, particularly a mobile electronic appliance. As a result, the memory system and the data processing system may be applied to wired and/or wireless electronic appliances. The network module 6940 may be included in the application processor 6930.

The storage module 6950 may store data, for example, data received from the application processor 6930, and transmit data stored therein to the application processor 6930. The storage module 6950 may be implemented by any of a nonvolatile memory such as a phase-change RAM (PRAM), a magnetic RAM (MRAM), a resistive RAM (ReRAM), a NAND flash memory, a NOR flash memory and a 3-dimensional NAND flash memory. Also, the storage module 6900 may be provided as a removable storage medium such as a memory card of the user system 6900 or an external drive. That is to say, the storage module 6950 may correspond to the memory system 110 described above with reference to FIG. 1, and may be implemented as the SSD, eMMC and UFS described above with reference to FIGS. 13 to 18.

The user interface 6910 may include interfaces for inputting data or commands to the application processor 6930 or for outputting data to an external device. For example, the user interface 6910 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a motor.

In the case where the memory system 110 described above with reference to FIG. 1 is applied to the mobile electronic appliance of the user system 6900 in accordance with an embodiment, the application processor 6930 controls general operations of the mobile electronic appliance, and the network module 6940 as a communication module controls wired and/or wireless communication with an external device, as described above. The user interface 6910 as the display and touch module of the mobile electronic appliance displays data processed by the application processor 6930 or supports input of data from a touch panel.

According to embodiments of the present invention, the memory system and the method for operating the memory system may rapidly process data during a read operation by copying or migrating the data that are likely to be read out, among a plurality of data stored in the MLC area of a non-volatile memory, into a cache area or the SLC area.

While the present invention has been illustrated and described with respect to the specific embodiments, it will be apparent to those skilled in the art in light of the present disclosure that various changes and modifications may be made without departing from the spirit and scope of the invention as defined in the following claims.

What is claimed is:

1. A memory system, comprising:
   a non-volatile memory including a main area and a first cache area; and
   a controller suitable for controlling the non-volatile memory and including a second cache area,
   wherein the controller includes:
   a read manager suitable for performing a migration operation of moving data stored in the main area into the first cache area or the second cache area based on a list storing a plurality of logical block addresses (LBAs) based on a read data access pattern,
   wherein the read manager detects data storage spaces of the first cache area or the second cache area during an idle time or at a predetermined period, reads from the list one or more LBAs corresponding to the detected data storage spaces of the first cache area or the second cache area, and reads and copies data corresponding to the LBAs from the main area and migrates the data stored in the main area into the first cache area or the second cache area.

2. The memory system of claim 1, wherein the list stores a plurality of LBAs arranged based on the frequency of performing a read operation (data read count), and updates the data read count at a set time.

3. The memory system of claim 1, wherein the number of the LBAs is based on the number of pages that are stored in the first cache area or the second cache area.

4. The memory system of claim 1, wherein data is stored in a multi-level cell in the main area, and data is stored in a single-level cell in the first cache area.

5. The memory system of claim 1, wherein the read manager deletes the data stored in the main area after the migration operation is performed.

6. The memory system of claim 1, wherein the read manager further includes
   reading and copying the data stored in the first cache area and storing the data in the second cache area based on the list according to the read data access pattern.

7. The memory system of claim 6, wherein the read manager detects the number of data storage spaces of the second cache area, and then reads from the list one or more LBAs corresponding to the detected number of the data storage spaces of the second cache area and reads and copies data corresponding to the LBAs from the first cache area and stores the data in the second cache area.

8. A method for operating a memory system including a non-volatile memory having a main area and a first cache area, and a controller controlling the non-volatile memory and having a second cache area, comprising:

reading a list that stores a plurality of logical block addresses (LBAs) based on a read data access pattern; and performing a migration operation of moving data stored in the main area into the first cache area or the second cache area based on the list, wherein detecting data storage spaces of the first cache area or the second cache area during an idle time or at a predetermined period, reading from the list one or more LBAs corresponding to the detected data storage spaces of the first cache area or the second cache area, reading and copying data corresponding to the LBAs from the main area and migrating the data stored in the main area into the first cache area or the second cache area.

9. The method of claim 8, wherein the list stores the plurality of LBAs arranged based on the frequency of performing a read operation (data read count), and updates the data read count at a set time.

10. The method of claim 9, wherein the number of the LBAs is based on the number of pages that are stored in the first cache area or the second cache area.

11. The method of claim 8, wherein data is stored in a multi-level cell in the main area, and data is stored in a single-level cell in the first cache area.

12. The method of claim 8, further comprising:
storing the data stored in the first cache area into the second cache area based on the read list.

13. The method of claim 12, the storing of the data stored in the first cache area into the second cache area based on the read list comprises:
detecting an idle time or at a predetermined period, detecting the number of the data storage spaces of the second cache area during the idle time or at the predetermined period, reading from the list one or more LBAs corresponding to the detected number of the data storage spaces of the second cache area, reading data corresponding to the LBAs from the first cache area, and storing the read data into the second cache area.

14. A memory system, comprising:
a non-volatile memory including a main area and a first cache area, the first cache area having a faster data access rate than that of the main area; and
a controller including a second cache area having a faster data access rate than that of the main area, the controller being configured to:
control the non-volatile memory,
maintain a list indicative of a number of times in a specific time period each of items of data are accessed, and
move items of data stored in the main area into the first or second cache area based on the list,
wherein the controller detects data storage spaces of the first or second cache area during an idle time or at a predetermined period, reads from the list one or more items of data corresponding to the detected data storage spaces of the first or second cache area and reads data corresponding to the items of data of the list from the main area and stores the read data in the first or second cache area.

15. A memory system, comprising:
a non-volatile memory having a first access area and a second access area that has a faster data access rate than that of the first area; and
a controller including a cache area, the controller being configured to:
maintain a list indicative of the relative frequencies at which items of data are accessed, and
move items of data from the first area to the second area or from the first area to the cache area based on the list,
wherein the controller detects data storage spaces of the second area or the cache area during an idle time or at a predetermined period, reads from the list one or more items of data corresponding to the detected data storage spaces of the second area or the cache area and reads data corresponding to the items of data of the list from the first area and storing the read data in the second area or the cache area.

* * * * *